(12) United States Patent
Roux

(10) Patent No.: US 9,003,701 B2
(45) Date of Patent: Apr. 14, 2015

(54) PLANT GROWTH METHOD AND ARTICLE

(76) Inventor: Constandina M. Roux, South New Berlin, NY (US)

( * ) Notice: Subject to any disclaimer, the term of this patent is extended or adjusted under 35 U.S.C. 154(b) by 297 days.

(21) Appl. No.: 13/397,091

(22) Filed: Feb. 15, 2012

(65) Prior Publication Data

US 2012/0240460 A1   Sep. 27, 2012

Related U.S. Application Data

(60) Provisional application No. 61/443,435, filed on Feb. 16, 2011.

(51) Int. Cl.
*A01G 17/10* (2006.01)
*A01G 17/00* (2006.01)

(52) U.S. Cl.
CPC ............. *A01G 17/005* (2013.01); *A01G 17/10* (2013.01)

(58) Field of Classification Search
CPC .............................. A01G 17/005; A01G 17/10
USPC ....................................................... 47/42, 44
See application file for complete search history.

(56) References Cited

U.S. PATENT DOCUMENTS

| | | | | |
|---|---|---|---|---|
| D221,459 S | * | 8/1971 | Wolf et al. | D8/355 |
| D287,564 S | * | 1/1987 | McCully | D8/1 |
| 4,649,665 A | * | 3/1987 | McBride | 47/42 |
| 4,655,000 A | * | 4/1987 | Swick et al. | 47/44 |
| 4,918,860 A | * | 4/1990 | Breadner | 47/42 |
| 5,301,464 A | * | 4/1994 | LaVanway et al. | 47/43 |
| D541,118 S | * | 4/2007 | Clark | D8/1 |
| 2008/0110085 A1 | * | 5/2008 | Merx | 47/42 |
| 2009/0183428 A1 | * | 7/2009 | Agullo | 47/44 |

\* cited by examiner

*Primary Examiner* — Son T Nguyen
(74) *Attorney, Agent, or Firm* — Thomas A. O'Rourke; Bodner + O'Rourke, LLP

(57) ABSTRACT

The present invention is directed to device and method for promoting plant growth. The device is a plant spacing member that has a body and a first end and a second end. The first end and second end have openings for receiving at least one plant limb therein to create a space between the limbs of the plant. An increased flow of air and light then flow through the created space to the interior of the plant to stimulate the growth of the plant. In addition, the increase flow of air and light dries the plant to reduce the accumulation of mold and mildew.

6 Claims, 18 Drawing Sheets

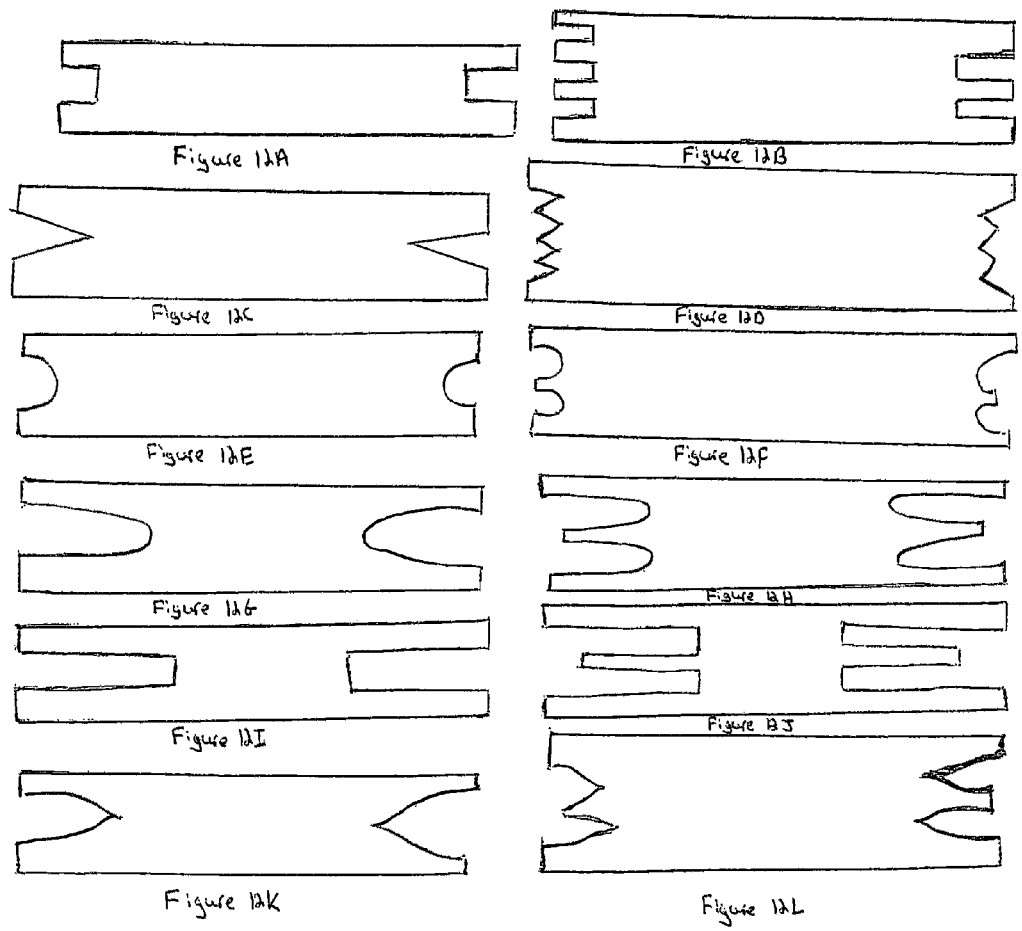
Figure 12A  Figure 12B
Figure 12C  Figure 12D
Figure 12E  Figure 12F
Figure 12G  Figure 12H
Figure 12I  Figure 12J
Figure 12K  Figure 12L
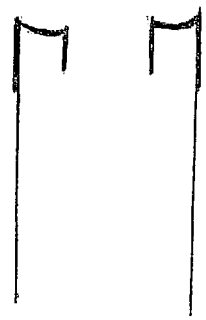
Figure 13

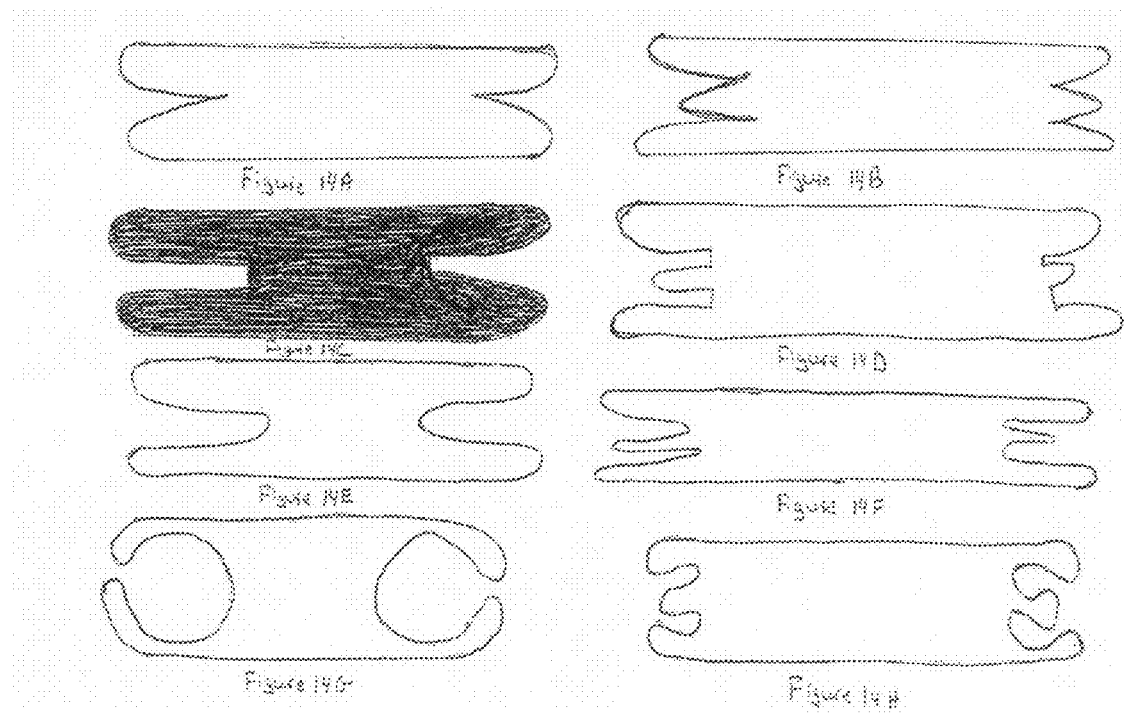

PLANT GROWTH METHOD AND ARTICLE

This application claims priority on U.S. Provisional Application Ser. No. 61/443,435 filed on Feb. 16, 2011, the disclosures of which are hereby incorporated by reference.

FIELD OF THE INVENTION

The present invention is directed to a method and article for stimulating plant growth which includes using a spacing member to create spaces between the branches or stems of a plant to allow sunlight and air to reach the interior of the plant. The spacing member includes a single flat or any other dimensional body portion that has at least one opening at a first end and at least one opening at a second end for receiving at least one branch or stem of a plant in each opening.

BACKGROUND OF THE INVENTION

All plants require very special care to effectively grow and maintain their health. Two of a plant's most important needs are sunlight and airflow. Plants are autotrophs, which mean that they produce their own food without depending on other organisms. One way in which plants produce their food is through photosynthesis where light energy is converted into chemical energy. This process allows plants to produce glucose from water and carbon dioxide, with the release of oxygen as a byproduct. Glucose is the universal building block that plants use to synthesis a variety of further organic substances for their survival. Without light, plants would not be able to live. Any plant that is trapped in darkness will focus all of its resources on finding a source of light. Only when a light source has been found will a plant start unfolding its leaves and stat photosynthesizing.

Plants also require an adequate flow of air to prosper. Air contains carbon dioxide which plants use during photosynthesis to produce glucose. The air also helps to dry a plant to prevent the occurrence of mold, mildew or other agents that thrive in damp or moist conditions.

A device that has been discloses to spread the branches of a plant is shown in U.S. Design Pat. No. 221,459 to Wolf, which teaches a tubular member that comprises at least two pieces that are telescopically mated for an adjustable fit. However, the member in Wolf resembles a bulky member that is not easy and convenient to use and that can have damaging effects to a plant. Plants usually have dense branching which makes it difficult to place articles therebetween. The tubular member in Wolf is a bulky two-piece member that will be difficult to be placed throughout a densely branched plant without damaging any of the branches. In addition, the length adjusting feature contributes to the bulkiness of the member and increases the chance that one or more branches may be damaged. The rustling of a person's hands and/or arms inside the branching of a plant to adjust the length of the member can damage or destroy one or more of the plant's branches. In addition a person may unintentionally and suddenly adjust the member to a longer or shorter length which may act on and damage branches.

Another significant disadvantage of Wolf is the pointed member that extends from the ends of Wolf's adjustable branch spreader. The pointed member pierces a hole into the branch of a plant to secure the branch spreader to the plant. This hole not only damages the branch but it can have damaging effects on the growth of the plant because it increases the chance of a bacterial or parasitic infection in the plant and it increases the chance of insects nesting within the plant. In addition, adding a plurality of Wolf's branch spreaders to a plant or repositioning Wolf's branch spreaders in a plant will cause even further damage to the plant.

As a result of the foregoing disadvantages, there is a need in the art for a convenient and easy to use plant spacing member that promotes and stimulates plant growth by increasing the amount of light and air that a plant receives while occupying a minimal amount of space in a plant.

The present invention addresses the foregoing need by disclosing a single piece plant spacing member that is a substantially flat member that occupies a minimal amount of space in the interior region of a plant when situated therein. This reduces the chance of one or more branches or stems being damaged when the spacing member is positioned between the branches or stems of a plant. The spacing member also does not penetrate any surface of a plant, thereby reducing the chance of a bacterial or parasitic infection occurring or an insect colony nesting within a plant.

OBJECTS OF THE INVENTION

It is an object of the present invention to provide a plant spacing member that can be placed between branches or stems of a plant to allow air and sunlight to flow to the interior region of the plant to promote plant growth and reduce the accumulation of mold and/or mildew.

It is another object of the invention to provide a plant spacing member that is easy and convenient to position and reposition throughout a plant or other object.

It is still another object of the invention to provide a plant spacing member that reduces the risk of a plant becoming leggy.

It is yet another object of the invention to provide a plant spacing member that can be produced from recycled materials and is therefore environmentally friendly. The materials may include, alone or in combination, metal, rubber, a biodegradable material, such as wood, and a plastic material, such as, vinyl.

It is a further object of the present invention to provide a method that is easy and convenient to use for promoting plant growth by increasing the flow of air and sunlight to the interior region of a plant.

It is an even further object of the present invention to provide a method for reducing the accumulation of mold and/or mildew throughout a plant or other object.

It is still an even further object of the present invention to provide a method for reducing the risk of a plant becoming leggy.

SUMMARY OF THE INVENTION

The present invention is directed to a device and method for holding, separating, shaping and forming plants. In particular, the device is a plant spacing member, preferably a generally planar plant spacing member, that includes a body that has at least a first end and a second end, a top surface and a bottom surface, and at least a first side and a second side. The body is preferably a thin, flat and single pieced longitudinal body. The first and second ends each preferably have at least one opening for engaging a branch, stem, vine, flower or the like to create, maintain, or increase a space therebetween for allowing air and sunlight to reach the interior of the plant to promote plant growth. Allowing additional light to reach the center of the plant increases growth, particularly flower growth, and reduces the risk that the plant may become leggy. In addition, the spreading of the branches or stems increases the amount of air that reaches the interior region of the plant to help dry the plant and in particular, to help reduce the accumulation of mold and/or mildew. Other applications of the present invention may include separating two or more plants to prevent damage during shipping and handling of the plants.

The spacing members may be placed horizontally, vertically or diagonally in a plant depending on the location of the branches, stems or other objects to be spaced. In addition, the spacing members can be made with flat sticks, like tongue pressers or Popsicle sticks that are generally planar members, and the spacing member may be solid or hollow in all dimensions.

The first end of the spacing member may have at least two first end extending arms and the second end of the spacing member also may have at least two second end extending arms. Each first end extending arm extends from a first end of the arm to a second end of the arm and combines with the at least one other first end extending arm to form at least one angular opening for receiving at least one branch, stem or other object at the first end of the spacing member. The first end extending arms are not connected at their second ends so that no closed loop connection is made, such as a ring-like opening, at the first end.

Similarly, each second end extending arm extends from a first end of the arm to a second end of the arm and combines with the at least one other second end extending arm to form at least one angular opening for receiving at least one of a different branch, stem or other object than the first end opening. The second end extending arms also do not connect at their second ends so that no closed loop connection is made for forming an opening at the second end.

The first end extending arms and/or the second end extending arms may extend in a certain fashion to form a certain type of angular opening. However, a variety of angular openings may be formed in any particular type of first end extension and second end extension. For example, first end extending arms that extend to form a Y-shaped extension will naturally have a V-shaped opening. However, the opening may be configured to resemble a square shape rather than a V-shape. In addition a square shaped extension may be configured or styled to have an opening that resembles a U-shape. This may be achieved by cutting or otherwise styling the surfaces of the extending arms that line the opening. The first end extending arms may extend in the same or may extend in a different fashion than the second end extending arms, and the opening(s) formed at the first end and second end may also be the same or different. Further, the second ends of the extending arms may be, but are not limited to, pointed, rounded, squared, capped, curved, or balled ends.

As discussed above, the first and/or second end extending arms may extend in a fashion that resembles a shape. One type of shape that was mentioned was a Y-shaped end wherein the Y shaped end is configured with the open end of the Y extending outwardly from the end of the spacing member such that a branch or stem may fit into and be held into place by the opening. In the practice of this particular embodiment of the present invention, the spacing member may be placed in between the branches of a plant to hold the branches at a distance by placing the branches in the opening at either end of the spacing member. The branches are separated across the length of the spacing member. In addition, more than one spacing member may be placed throughout a plant to create more space throughout a plant for receiving the flow of air and/or sunlight.

Other shapes that the extensions may combine to form include, but are not limited to, A shaped ends, U shaped ends, V shaped ends, C shaped ends, wrench shaped ends, arrow shaped ends, round shaped ends, square shaped ends, rectangular shaped ends, flat shaped ends, curved shaped ends, petal shaped ends, star shaped ends, and jagged shaped ends. Further, the spacing member may have a first end and a second end that have the same or differently shaped ends.

The openings that are formed by the extending arms may be the openings that are formed naturally by the extensions, such as a V shaped opening in a Y shaped extension or a round shaped opening in a C shaped extensions. However, angular cutouts may be made in the openings to a form a variety of differently styled openings, including, but not limited to, a V style cutout, a curved V style cutout, a U cutout, an ovular cutout, an arrowhead cutout, a circular cutout, a square cutout, a rectangular cutout, a star shaped cutout or a cutout resembling a leaf petal. Alternatively, rather than having extending arms at the first and/or second ends of the spacing member, the first and/or second end of the spacing member may have at least one recess portion for receiving at least one branch, stem or other object. In this embodiment, the recessed portion may be, but is not limited to, a V shaped recess, a C shaped recess, a U shaped recess, an arrowhead shaped recess, a square shaped recess, a rectangular shaped recess or a leaf petal shaped recess.

According to even further embodiments, at least a portion of the surfaces that line the openings may be lined with cuts, such as notches, to further help in holding the branches, stems or other objects in place.

The present invention also allows at least one object holding member that may extend from a surface that lines the opening into at least a portion of the space of the opening. The object holding member helps to further secure one or more objects in the opening at the ends of the spacing member.

The body can be any length and width but is preferably in the shape of a thin single piece longitudinal member that is substantially straight and that has a length greater than its width. However, the body may be any other shape such as but not limited to ovular, square, triangular, rectangular or circular. In addition, the cross sectional shape of the spacing member taken along a vertical axis is preferably flat but it may be triangular, tubular, square, rectangular or the like. The spacing member is also preferably constructed of a material that is strong enough to create and maintain a space between a branch, stem or other object while also being light enough to allow for easy handling. Suitable materials may be a biodegradable material, such as a wood, a rubber material, lightweight metal material, a plastic material, or a recycled material such as vinyl.

The spacing member may also be bendable so that it can it create a space between branches that may not otherwise be created without bending the spacing member. In addition, the spacing member is preferably a thin member that has a thickness of about 1 mm but that may have a thickness of from about 0.1 mm to about 10.0 mm. Preferably, the thickness of the spacing member may be from about 0.3 mm to about 5.0 mm. More preferably, the thickness of the spacing member may be from about 0.5 mm to about 2.5 mm. Most preferably, the thickness of the spacing member may be from about 0.7 mm to about 1.25 mm. The thickness of the spacing member is preferably the same throughout the entire length of the spacing member. Custom sizes, larger or smaller of any length, width or dimension can be made for larger or smaller trees or plants.

In addition to promoting plant growth, the plant support member may also be used to create floral arrangements by placing the support members in desired locations throughout an arrangement. Even further, the support member may be used to allow airflow and sunlight to the interior region of other objects, such as artistic creations or models, including model airplanes, model ships, model cars, 3-D puzzles or the like. The spacing member may also be used to hold, separate, shape, and/or form different parts of the foregoing objects.

The present invention also contemplates that the spacing member may have a means for attaching one or more spacing members thereto so that a larger space for receiving air and sunlight may be created. For example, a second spacing member may be attached to a first spacing member in a cross-like configuration. The attaching means may include aligning holes placed on the body of the spacing members and inserting a pin through the hole. In addition, Velcro hook and loop fastening means may be used or an adhesive may be placed on one or more of the spacing members. Alternatively, any other means used by one skilled in the art may also be used.

Other embodiments of the present invention allow for the spacing member to have an angularly or irregularly shaped body rather than a substantially straight body. For example, the body may resemble a right angle or a zigzag and may have an opening at its transitions in addition to its ends to allow the member to act on more branches, stems or other objects. The spacing member may also have one or more arms that extend from and/or recesses that are positioned in its body at its body's sides and/or ends and or along its body's width and/or length. The spacing member may also have a second body portion that extends from the main body portion and that may have recesses and/or extending arms that form an opening for receiving an object. The spacing member may also have a combination of openings that are formed by extending arms and openings that are formed by recesses. These further embodiments allow for the spacing member to act upon even more branches, stems or other objects.

Even further, at least one of the openings of the spacing member may include a latch, clip or other mechanism for further securing a branch or other object to the spacing member.

The present invention also allows for the spacing member to have a top surface that is a different color than the bottom surface to help during the plant growth phase. In this embodiment, it is preferred that one surface of the spacing member is white and the other surface is green. As the plant is growing, the spacing member may be placed in the plant with its white surface facing outwards so that a gardener or planter can easily spot the spacing members and reposition them as desired. After the plant has finished growing, the spacing members can be placed with their green side facing outwards so that the spacing members will be hard to discern from the plant. Other colors may also be used, such as a brown color rather than a green color or another color that blends in with a plant. In addition a red, yellow, or other easily discernible color rather than a white color may be used during the plant growth phase.

BRIEF DESCRIPTION OF THE DRAWINGS

FIGS. 12A-12L show embodiments of FIGS. 5 and 6 where the one or more recesses are shaped differently and where the spacing members have squared endpoints.

FIG. 13 shows a spacing member having square-curved shaped endpoints.

FIGS. 14A-14H show embodiments of FIGS. 5 and 6 where the one or more recesses are shaped differently and where the spacing members have rounded/oval endpoints.

FIG. 18B shows a holding member extending into the recessed opening.

FIGS. 20A-20F show the different cross sectional shapes that the spacing member may assume.

DETAILED DESCRIPTION OF THE INVENTION

Figure 1A:
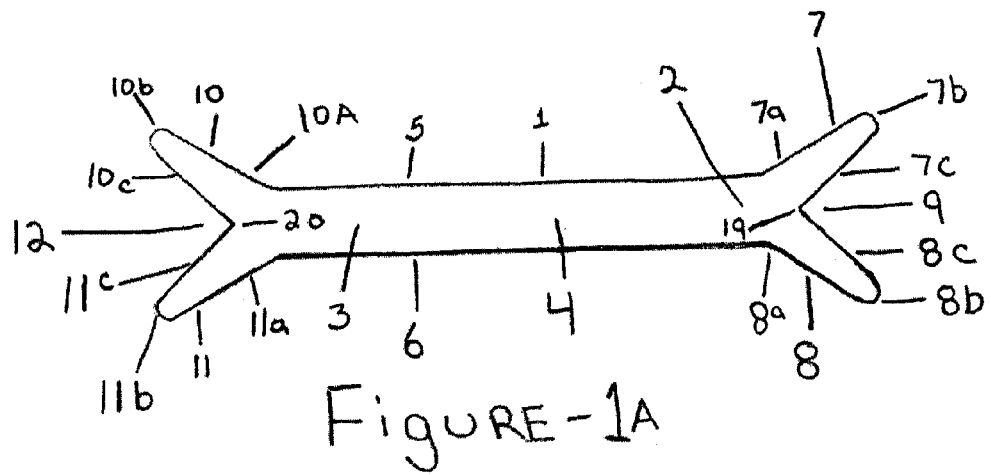
FIG. 1A shows a perspective view of a preferred embodiment of the spacing member of the present invention that has Y shaped ends that are rounded/oval.

FIGS. 1A-1D depict embodiments of the spacing member of the present invention that has a first arm and a second arm that extends from the first end of the spacing member to form a shaped first end and that has a first arm and a second arm that extends from the second end of the spacing member to also form a shaped second end. FIG. 1A shows a preferred embodiment of the spacing member that includes a substantially straight and thin longitudinal body portion 1 that is a single piece and that has a length greater than its width. The spacing member also has a first end 2 and a second end 3 that are oppositely situated and a top surface 4, a bottom surface (not shown), a first side 5 and a second side 6. A first end first extending arm 7 extends angularly from the first side 5 of the first end 2 and a first end second extending arm 8 extends angularly from the second side 6 of the first end 2. The first end extending arms 7 and 8 combine to form a Y shaped first end that has a first end opening 9 for receiving a branch, stem or other object. The spacing member also includes a second end first extending arm 10 that extends angularly from the first side 5 of the second end 3 and a second end second extending arm 11 that extends angularly from the second side of the second end. The second end extending arms also combine to form a Y shaped second end that has a second end opening 12 for receiving a branch, stem or other object that is different from the first end opening 9. Also shown in FIG. 1A is the first end first arm 7 and the first end second arm 8 each extending from the first end 2 of the spacing member at a first end of the first end first arm and the first end second arm 7a and 8a to a second end of the first end first arm and the first end second arm, respectively, 7b and 8b that are rounded second ends. Similarly, the second end first arm 10 and the second end second arm 11 are shown as extending from the second end 3 of the spacing member at a first end of the second end first arm and the second end second arm 10a and 11a to a second end of the second end first arm and second end second arm, respectively, 10b and 11b wherein the second ends 10b and 11b of the arms are rounded. FIG. 1A further depicts the surface of the first end first arm and the first end second arm 7c and 8c that line the opening 9 that is formed by the arms 7 and 8, and the surface of the second end first arm and the second end second arm 10c and 11c that line the opening 12 that is formed by the arms 10 and 11.

It is important to note that the Y shaped first and second ends 2 and 3 of FIG. 1A form a first end V shaped opening 9 and a second end V shaped opening 12. The V shaped openings naturally form from a Y shaped configuration. However, in other embodiments, the openings 9 and 12 may be styled to resemble any of the shapes discussed herein. In addition it is also important to note that the second ends 7b and 8b of the first end extending arms and the second ends 10b and 11b of the second end extending arms are not connected so that the openings are in the form of angular recesses rather than a closed loop, ring-like, connection. Also of note is that the first and second extending arms of the first end 7 and 8 converge at a point 19 and that the first and second extending arms of the second end 10 and 11 also converge at a point 20.

Figure 1B:
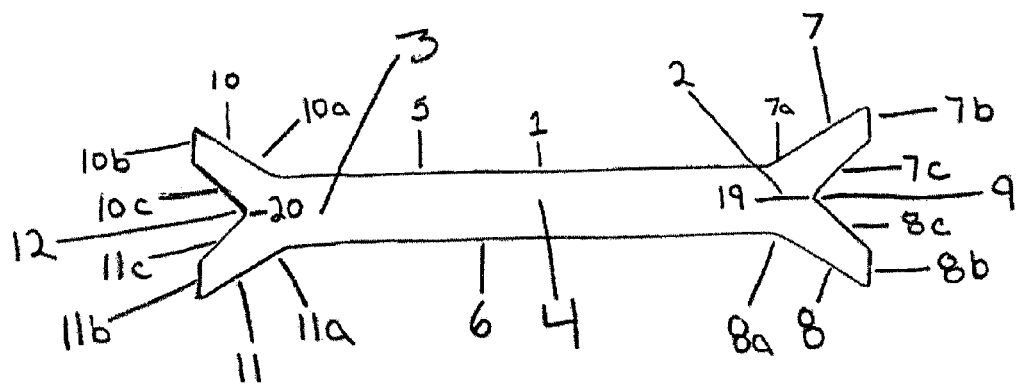
FIG. 1B shows a perspective view of an embodiment of the spacing member that has Y-shaped ends that are squared.

FIG. 1B shows an alternate embodiment of FIG. 1A. FIG. 1B shows the spacing member having the same features as FIG. 1A except for the second ends 7b and 8b of the first end extending arms and the second ends 10b and 11b of the second end extending arms being squared.

Figure 1C:
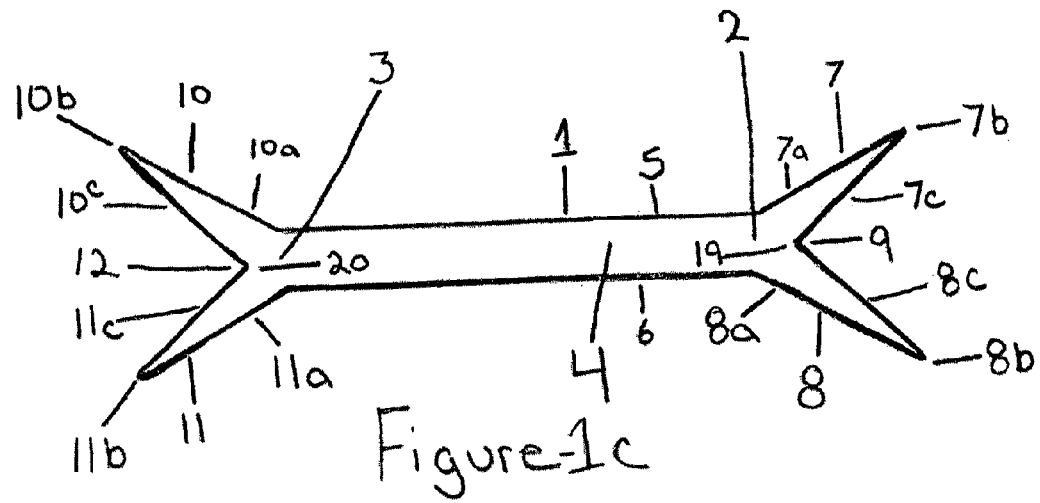
FIG. 1C shows a perspective view of a further embodiment of the spacing member that has Y-shaped ends that are pointed.

FIG. 1C shows a further alternate embodiment of the spacing member of FIG. 1A. It shows the same features as FIG. 1A, but the second ends 7b and 8b of the first end extending arms and the second ends 10b and 11b of the second end extending arms are pointed instead of rounded.

Figure 1D:
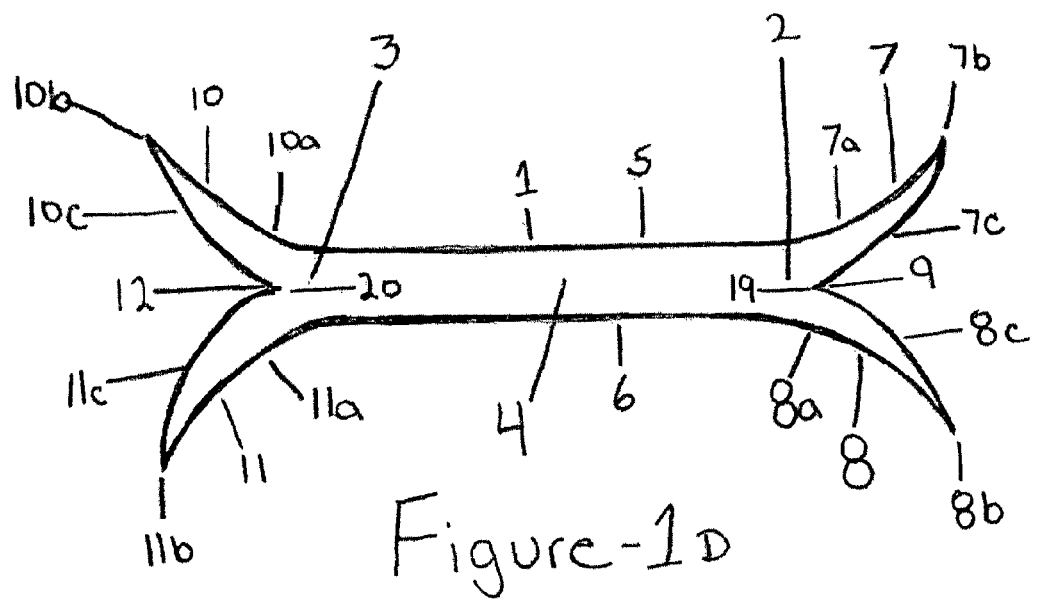
FIG. 1D shows a perspective view of an even further embodiment of the spacing member that has petal shaped ends that are pointed.

FIG. 1D shows an even further alternate embodiment of FIG. 1A. FIG. 1D depicts the first end extending arms 7 and 8 as resembling a leaf petal shape that extend to pointed second ends 7b and 8b. FIG. 1D also shows the second end extending arms 10 and 11 as resembling a leaf petal shape that each extend to pointed second ends 10b and 11b.

Other ends may be resembled by the first end and second end extending arms rather than the Y and leaf petal shaped ends as shown in FIGS. 1A-1D. These other shaped ends may be used on one or both ends of the spacing member and include, but are not limited to, A shaped ends, U shaped ends, V shaped ends, C shaped ends, arrow shaped ends, wrench shaped ends, round shaped ends, square shaped ends, rectangular shaped ends, flat shaped ends, curved shaped ends, petal shaped ends, star shaped end, and jagged shaped ends. Further, the spacing member may have a first end and a second end that have differently shaped ends.

Figure 2:
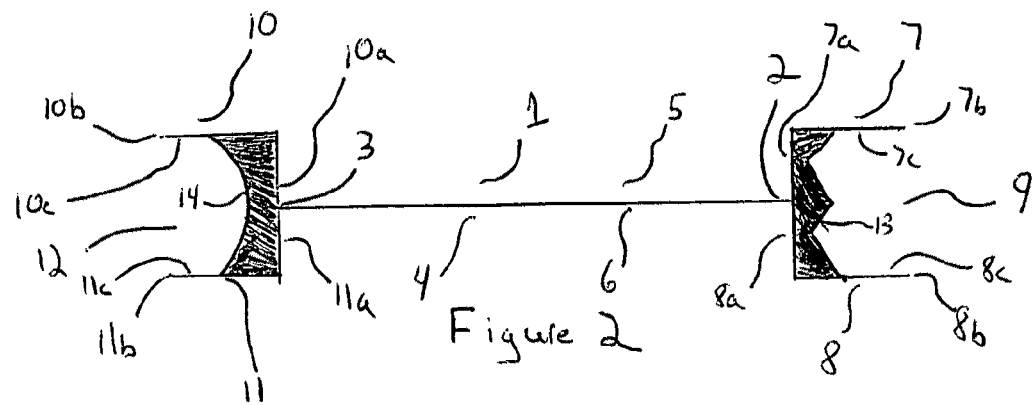
FIG. 2 shows a perspective view of an alternate embodiment of the spacing member that has a stick like body with square shaped ends that have different angularly styled cutouts at each end's opening.

FIG. 2 shows an alternate embodiment of FIG. 1A. It shows a spacing member that has a single-piece stick-thin longitudinal body that has a first arm 7 extending from the first side 5 of the first end 2 of the spacing member and a second arm 8 extending from the second side 6 of the first end 2 of the spacing member to form a box-shaped first end 2 that has an opening 9 for receiving a branch, stem or other object. The second end is shown as having an extending first arm 10 from the first side 5 of the second end 3 and an extending second arm 11 from the second side 6 of the second end to form a box-shaped second end 3 that has an opening 12 for a receiving a branch, stem or other object that is different than the first opening 9. A portion of the surfaces of the first end first arm and first end second arm 7c and 8b that line the first end opening 9 have been angularly styled to represent a plurality of V shaped cuts or a jagged edge 13 in the first end opening 9. A portion of the surfaces of the second end first arm and the second end second arm 10c and 11c that line the second end opening 12 have been angularly styled to represent a U-shaped cut 14. In other embodiments, different angularly styled cutouts that have been described herein may be used in the openings.

Figure 3:
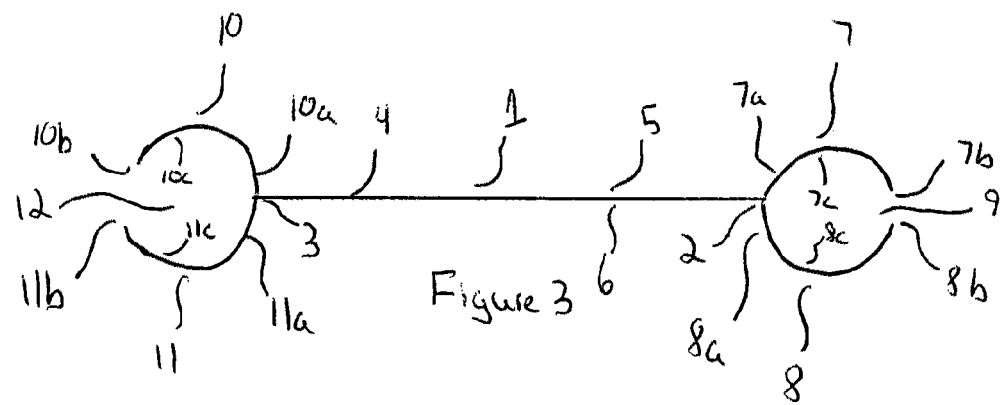
FIG. 3 shows a perspective view of an embodiment of the spacing member that has a stick like body portion with round shaped ends.

FIG. 3 shows an alternate embodiment of FIG. 1A. In FIG. 3, as in FIG. 2, the body 1 is a single piece stick-like member. However, the ends 2 and 3 of the spacing member have first end extending arms 7 and 8 second end extending arms 10 and 11 that form C shaped ends. The openings 9 and 12 formed at the first and second end 2 and 3 of the spacing member are rounded openings that do not have any specially styled angular cutouts.

Figure 4:
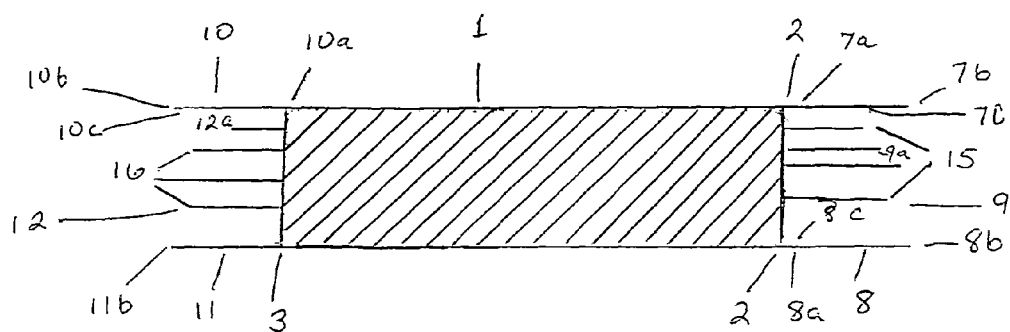
FIG. 4 shows a perspective view of the spacing member that has a box shaped opening at each end of the spacing member to form openings for receiving a branch, stem or other object and that has holding members extending inside of the openings.

FIG. 4 depicts a further alternate embodiment of FIG. 1A. FIG. 4 shows the spacing member as having a first end first extending arm 7 and a first end second extending arm 8 extending straight outwards from the first side 5 and second side 6, respectively, of the first end 2 to form a box shaped opening 9 for receiving a branch, stem or other object. Also shown in the box-shaped opening are a plurality of first end holding members 15 that extend perpendicularly from the surface 9a of the first end that is situated between the first end extending arms 7 and 8. In addition, the spacing member is shown as having a second end 3 that has a second end first extending arm 10 and a second end second extending arm 11 that extend straight outwardly from the first and second side 5 and 6, respectively, of the spacing member's second end 3 to form a box shaped opening 12 for receiving a branch, stem or other object that is different than the branch, stem or other object received by the first end opening 9. The box shaped second end opening 12 is further shown as having a plurality of holding members 16 extending perpendicularly from the surface 12a of second end that is positioned between the second end extending arms 10 and 11. The first and second end holding members 15 and 16 help to further secure the branches or other objects that are received by the first and second end openings 9 and 12. One or more branches or other objects may be placed in at least one of the spaces created by the holding members.

Figure 5:
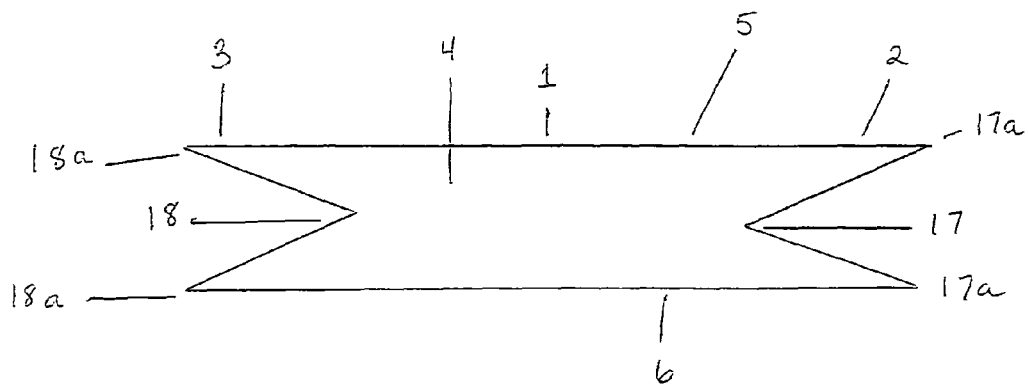
FIG. 5 shows a perspective view of an alternate embodiment of the spacing member that has a V shaped recess portion at each of the first and second ends of the spacing member for receiving a branch, stem or other object.

The present invention also contemplates at least one end of the spacing members having at least one holding member that extends from a surface that lines the spacing member's openings into at least a portion of the space of the opening. FIG. 5 shows a plurality of first end holding members 21 and second end holding members 22 that extend in a perpendicular fashion from the base surface of the first and second end openings 23 and 24. In other embodiments, the holding member may extend from other surfaces that line the opening in addition to or rather than the base surface as shown in FIG. 5. Moreover, the holding members may extend in a fashion other than perpendicularly.

Figure 6:
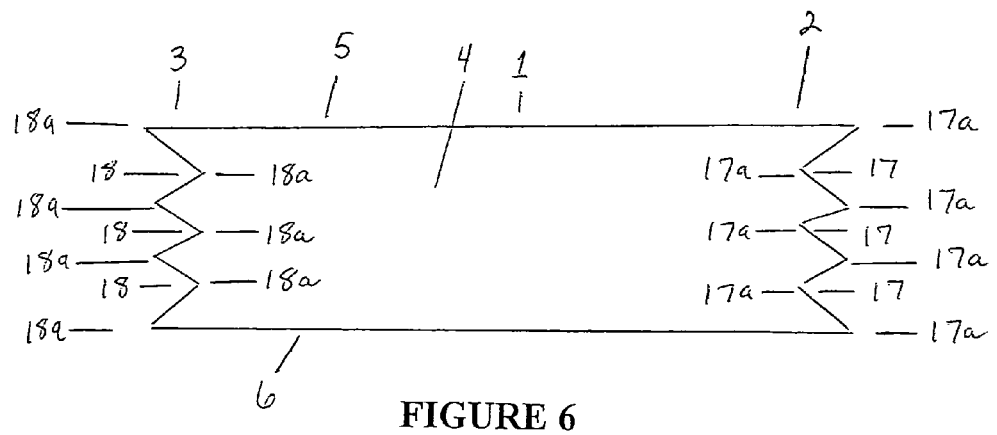
FIG. 6 shows a perspective view of an alternate embodiment of the spacing member that has a plurality of V shaped recesses at each of the first and second ends of the spacing member.
Figure 7:
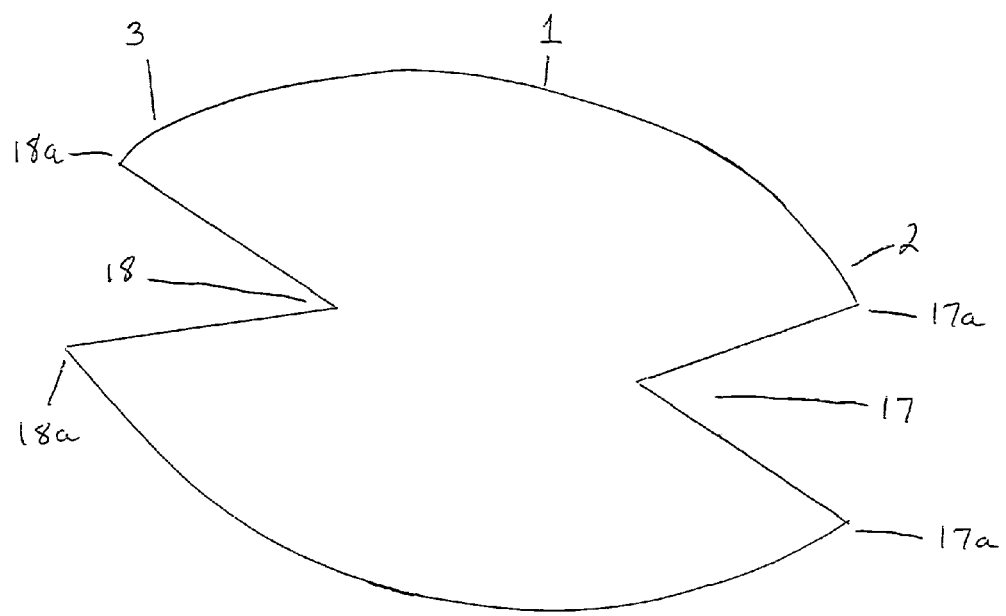
FIG. 7 shows a perspective view of the spacing member that has an oval shaped body portion with a V shaped recess portion at its first and second end.

FIGS. 5-7 show an embodiment of the spacing member that has one or more recessed portions at the first and second end of the spacing member to form one or more first end and second end openings rather than extending arms as shown in FIGS. 1A-4. FIG. 5 shows the body portion 1 of the spacing member as having a first end 2 and a second 3, a top surface 4, a bottom surface (not shown), a first side 5 and a second side 6. The first and second ends 2 and 3 are shown as each having one recessed portion 17 and 18 for receiving a branch, stem or other object. The recessed portions in this embodiment resemble a V shape, but in other embodiments one or more of the recessed portions may resemble any of the differently shaped recesses that have been discussed herein. In addition, the endpoints of the first end and second end recess portion 17a and 18a are pointed, but otherwise one or more endpoints may be rounded, squared, capped, curved, or balled.

FIG. 6 shows the spacing member as having a plurality of V shaped recess portions 17 and 18 at its first and second end 2 and 3 wherein the endpoints 17a and 18a of the recess portions are pointed.

FIG. 7 shows an embodiment of the invention where the body 1 is ovular and the first end 2 and second end 3 have one V shaped recess portion 17 and 18 to form an opening for receiving a branch, stem or other object. The endpoints 17a and 18a of the recessed portions 17 and 18 are pointed.

Figure 8:
FIG. 8 shows a cross sectional view of an embodiment of the spacing member that is substantially planar throughout its length.
Figure 9A:
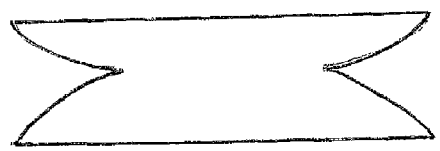
FIGS. 9A-9I show embodiments of FIGS. 5 and 6 where the one or more recesses are shaped differently.
Figure 9B:
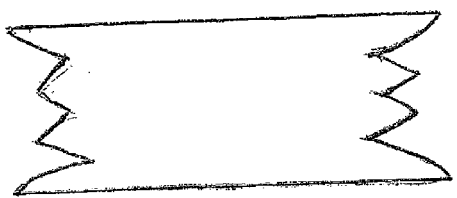
Figure 9C:
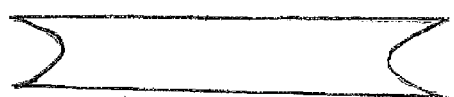
Figure 9D:
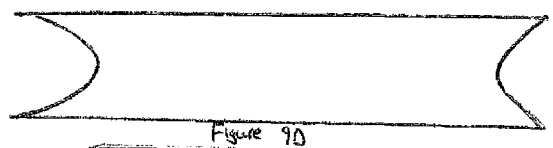
Figure 9E:
Figure 9F:
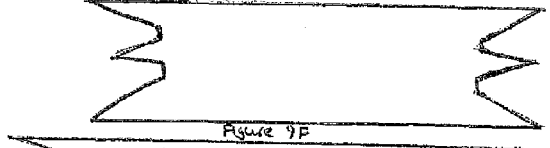
Figure 9G:
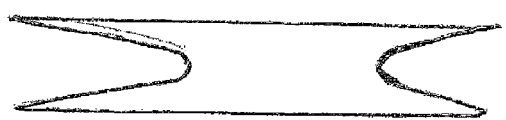
Figure 9H:
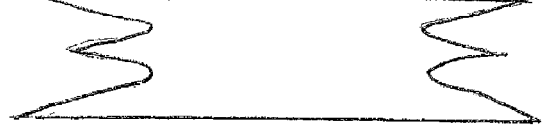
Figure 9I:
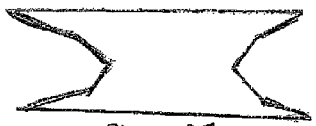
Figure 10A:
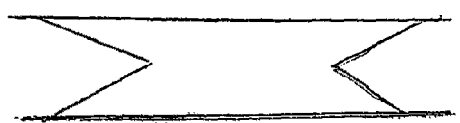
FIGS. 10A-10I show embodiments of the present invention that has sharp tipped pointed ends with differently shaped recesses.
Figure 10B:
Figure 10E:
Figure 10F:
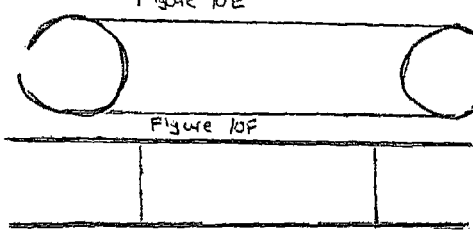
Figure 10G:
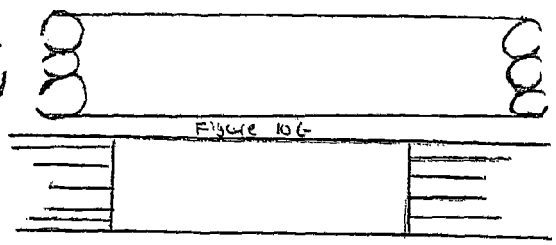
Figure 10H:
Figure 10I:
Figure 11:
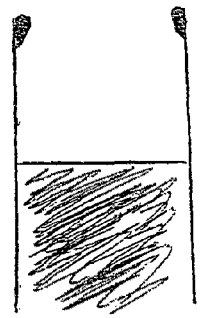
FIG. 11 shows a spacing member having balled endpoints.
Figure 10C:
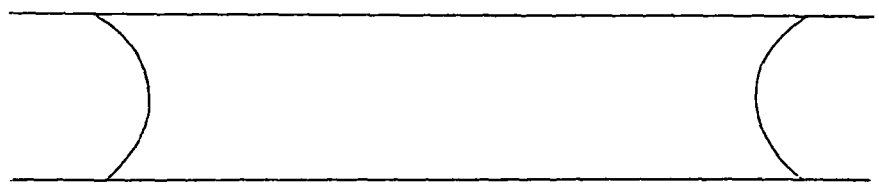
Figure 10D:
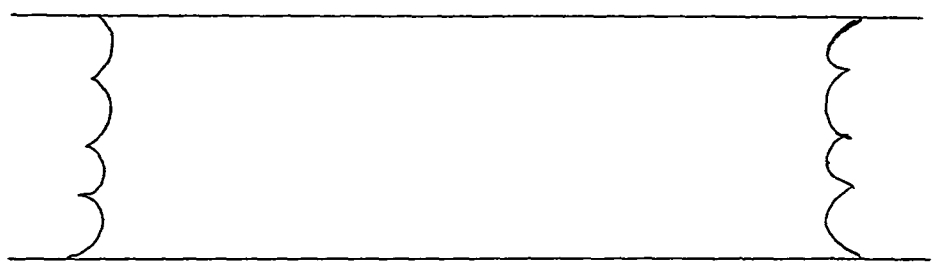
Figure 15A:
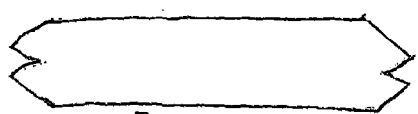
FIGS. 15A-15D show embodiments of FIGS. 5 and 6 where the one or more recesses are shaped differently and where the spacing members have capped endpoints that are pointed.
Figure 15B:
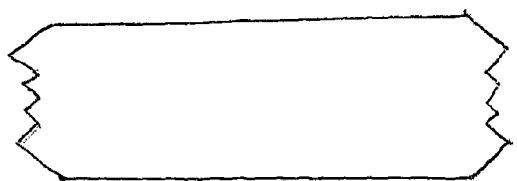
Figure 15E:
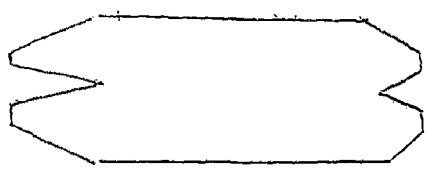
FIGS. 15E-15F show embodiments of FIGS. 5 and 6 where the one or more recesses are shaped differently and where the spacing members have capped endpoints that are squared.
Figure 15F:
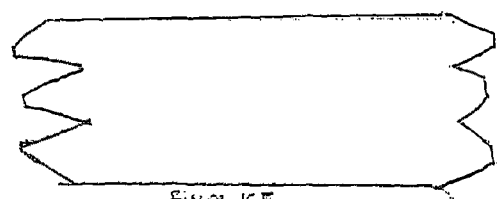
Figure 15G:
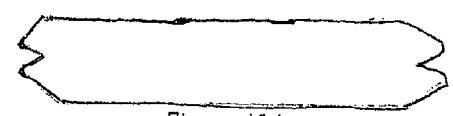
FIGS. 15G-15H show embodiments of FIGS. 5 and 6 where the one or more recesses are shaped differently and where the spacing members have capped endpoints that are pointed.
Figure 15H:
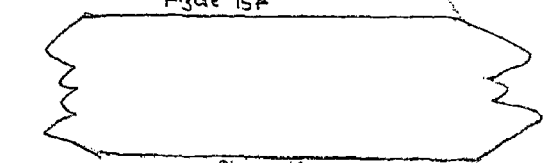
Figure 15I:
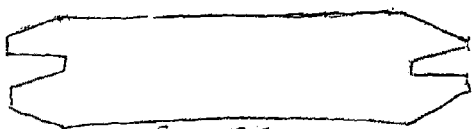
FIGS. 15I-15J show embodiments of FIGS. 5 and 6 where the one or more recesses are shaped differently and where the spacing members have capped endpoints that have rectangularly shaped endpoints.
Figure 15J:
Figure 16:
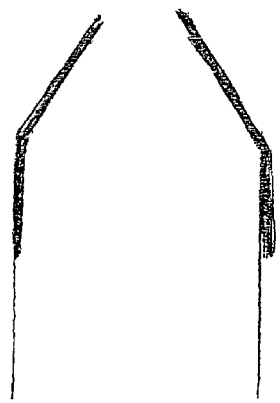
FIG. 16 shows a spacing member having a capped shaped end.
Figure 15C:
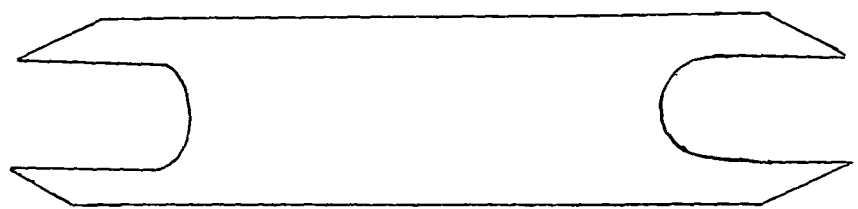
Figure 15D:
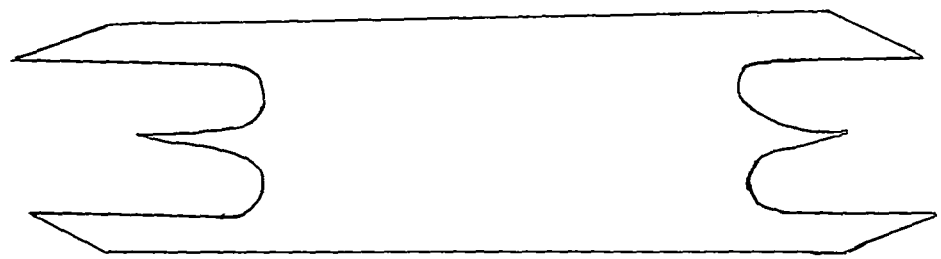
Figure 17A:
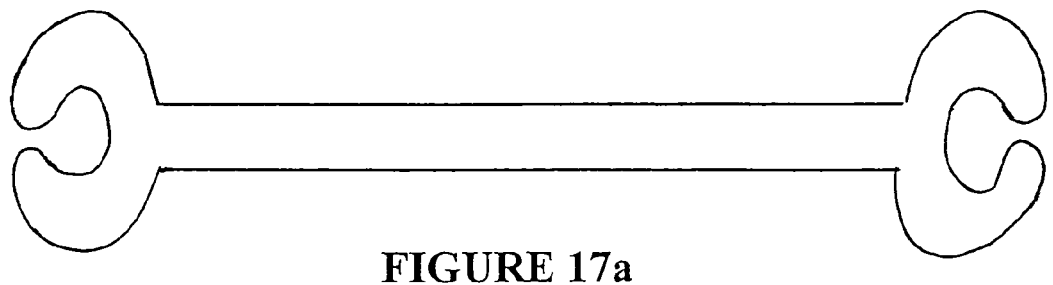
FIGS. 17A-17C show embodiments where the spacing member has wrench shaped ends that have form differently shaped recesses.
Figure 17B:
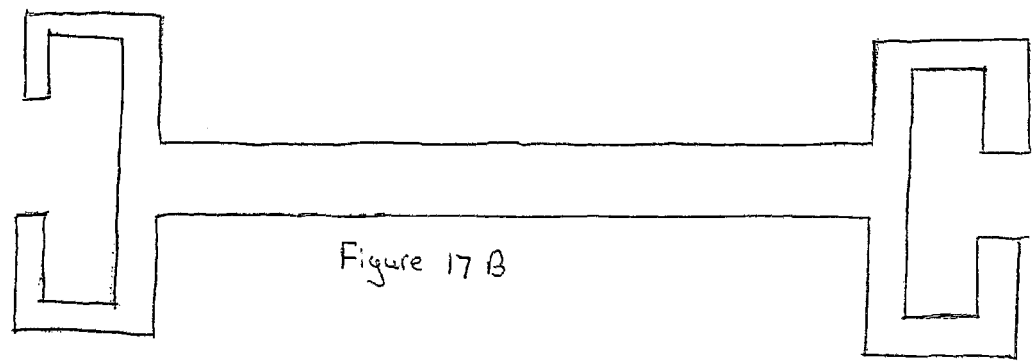
Figure 17C:
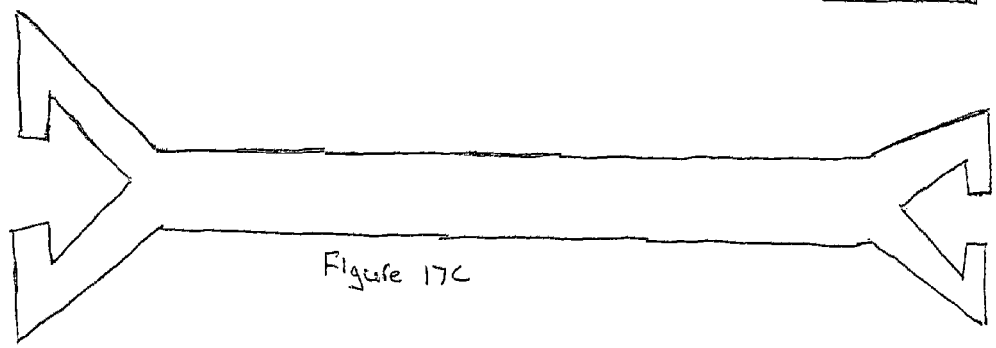
Figure 18A:
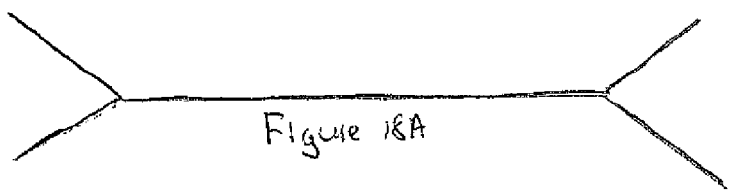
FIGS. 18A-18G show alternate embodiments of FIG. 3 wherein the spacing members having differently shaped ends and differently shaped recesses.
Figure 18B:
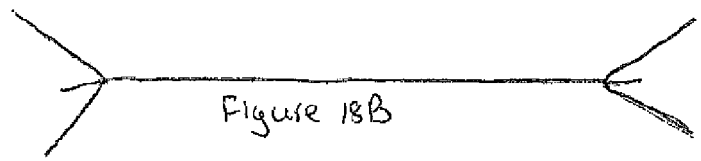
Figure 18C:
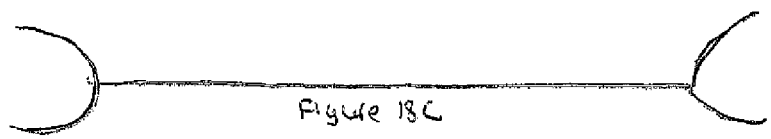
Figure 18D:
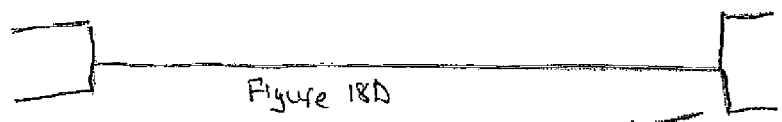
Figure 18E:
Figure 18F:
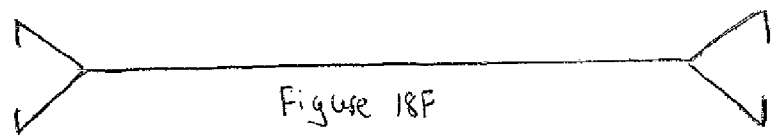
Figure 18G:
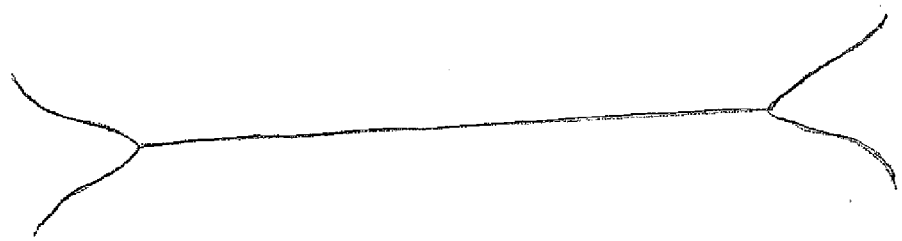
Figure 19A:
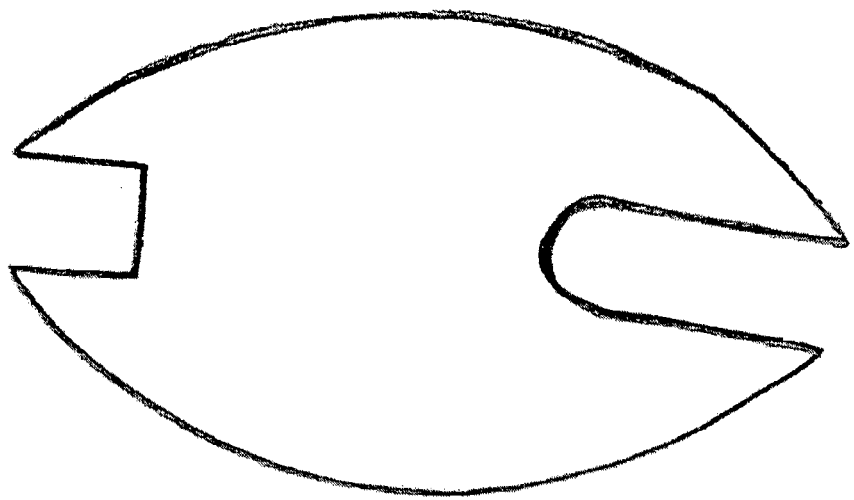
FIGS. 19A-19B show alternate embodiments of FIG. 7 wherein the recesses are shaped differently.
Figure 19B:
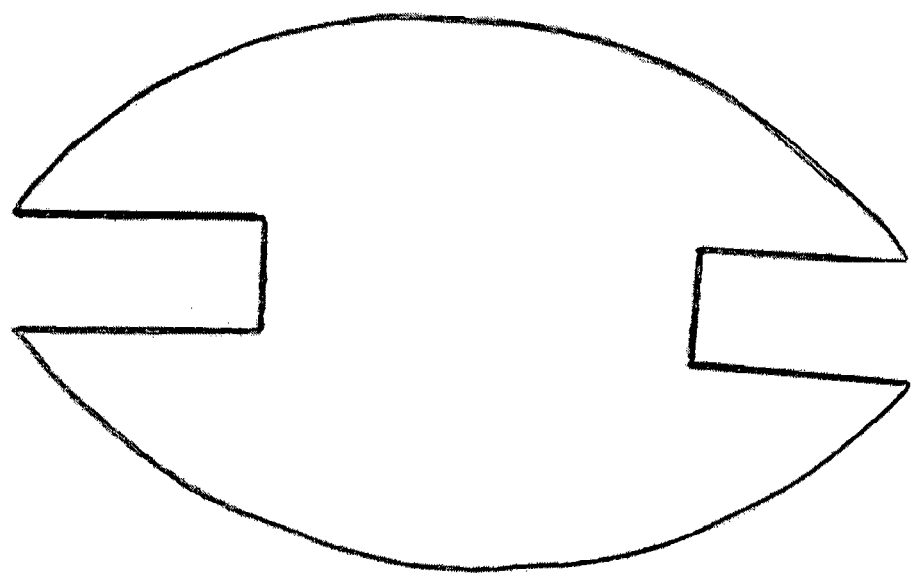

FIG. 8 is a cross sectional view of an embodiment of the spacing member taken along a vertical axis. FIG. 8 shows the spacing member as being generally planar. In other embodiments however, rather than being generally planar, there may be a longitudinal fold along at least a portion of the spacing member that forms a ridge on the bottom or top surface of the spacing member. The fold contributes to the structural integrity of the spacing member. In this embodiment, the ridge preferably runs along the entire length of the spacing member.

What is claimed is:

1. A method for promoting the growth of a plant, comprising:
   placing at least one spacing member in between at least a first limb and a second limb of the plant thereby increasing an amount of space between said limbs, wherein said spacing member receives the first limb at a first end of said spacing member in a recess formed between a first arm and a second arm extending from a body portion of said spacing member, and wherein said spacing member receives by receiving the second limb at a second end of said spacing member in a recess formed between a third arm and a fourth arm extending from said body portion of said spacing member;
   using a first color on a first side of each said at least one spacing member with said first color, said first color differentiates said spacing member from the plant, and using a second color on a second side of each said at least one spacing member with said second color configured for blending in with the plant;
   during a period of substantial plant growth and shaping the growth of the plant to be as desired, placing said at least one spacing member with said first side of said spacing member facing outwardly for easier spotting of said spacing member; and
   during a period of insubstantial plant growth, repositioning said placement of said at least one spacing member with said second side of said spacing member facing outwardly, said second side of said spacing member visually blends with the plant for making it difficult to see said at least one spacing member in the plant.

2. The method according to claim 1 further comprising using red or white as said first color on said first side of said spacing member, and using green or brown as said second color on said second side of said spacing member.

3. The method according to claim 2 further comprising selecting a length of said body member for each said at least one spacing member for said providing of said increased amount of space between the first and second limbs.

4. The method according to claim 1 further comprising using a flexible material for forming said spacing member.

5. The method according to claim 1 further comprising forming said spacing member to have a thickness in the range of 0.1 mm to 10.0 mm.

6. The method according to claim 1 further comprising using a biodegradable material for said spacing member.

* * * * *